F. A. COLE.
MOVING PICTURE MACHINE.
APPLICATION FILED JAN. 4, 1909.
947,095.
Patented Jan. 18, 1910.
3 SHEETS—SHEET 1.
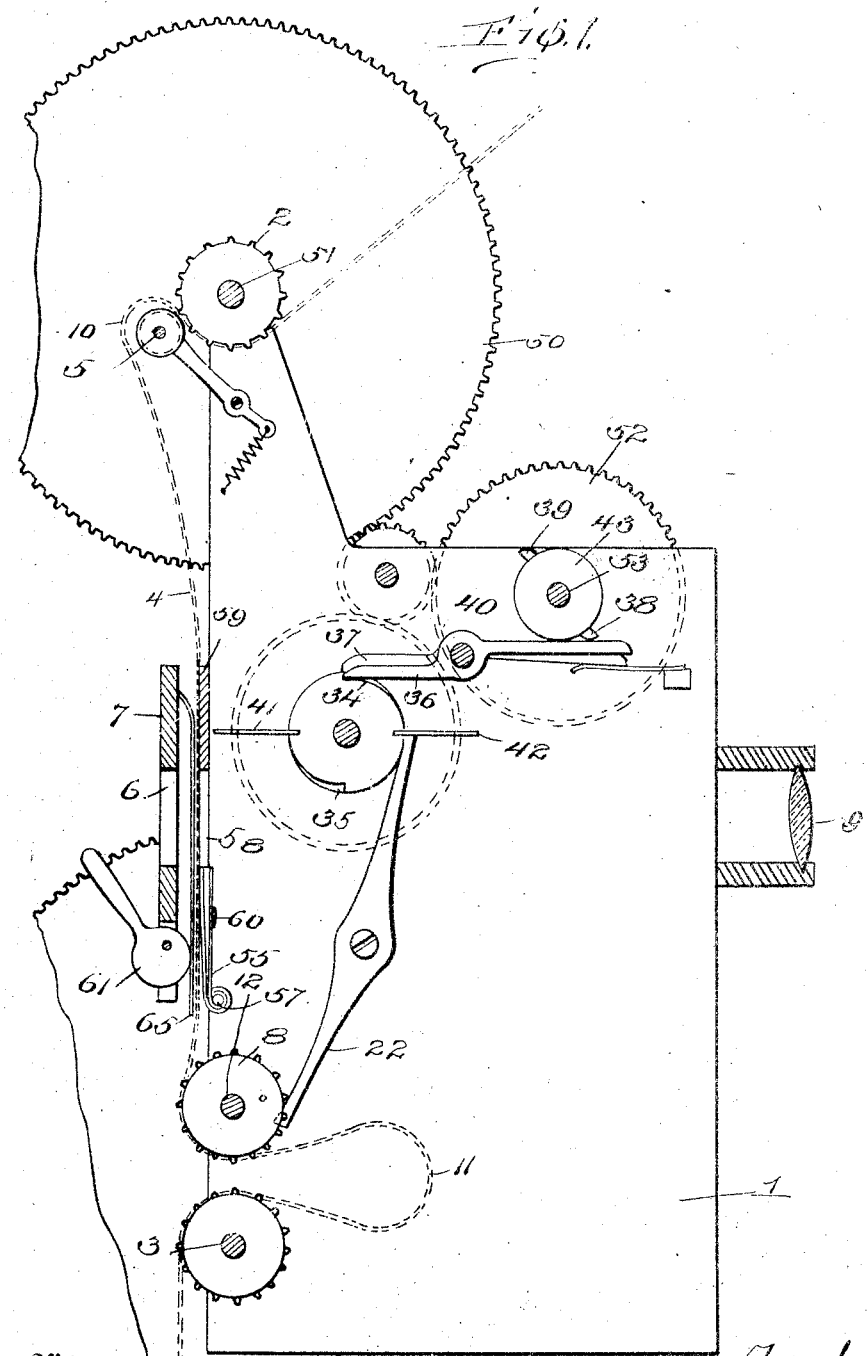

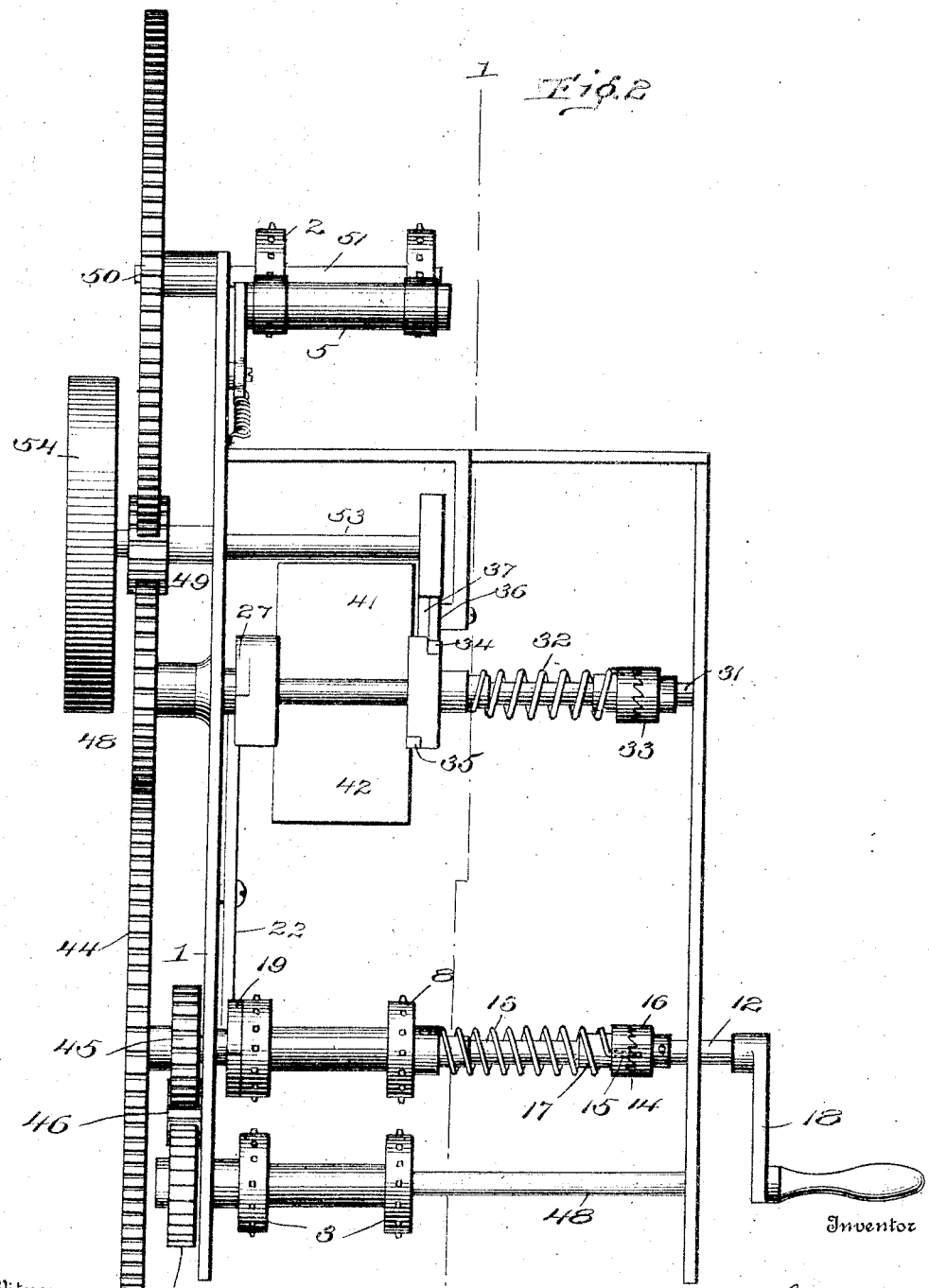

F. A. COLE.
MOVING PICTURE MACHINE.
APPLICATION FILED JAN. 4, 1909.
947,095.
Patented Jan. 18, 1910.
3 SHEETS—SHEET 3.
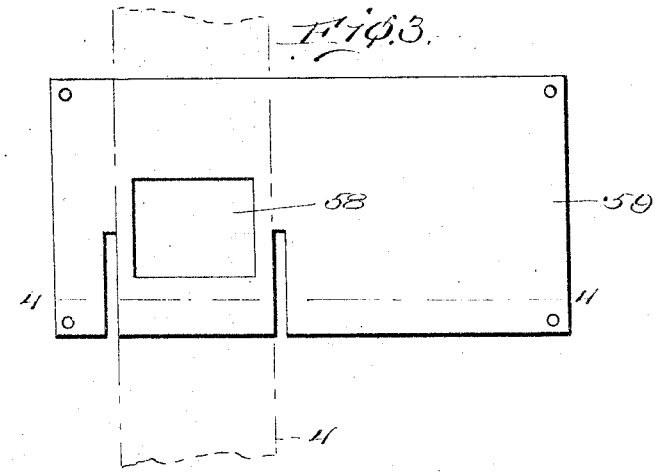
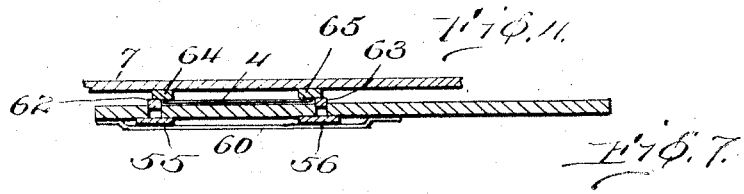
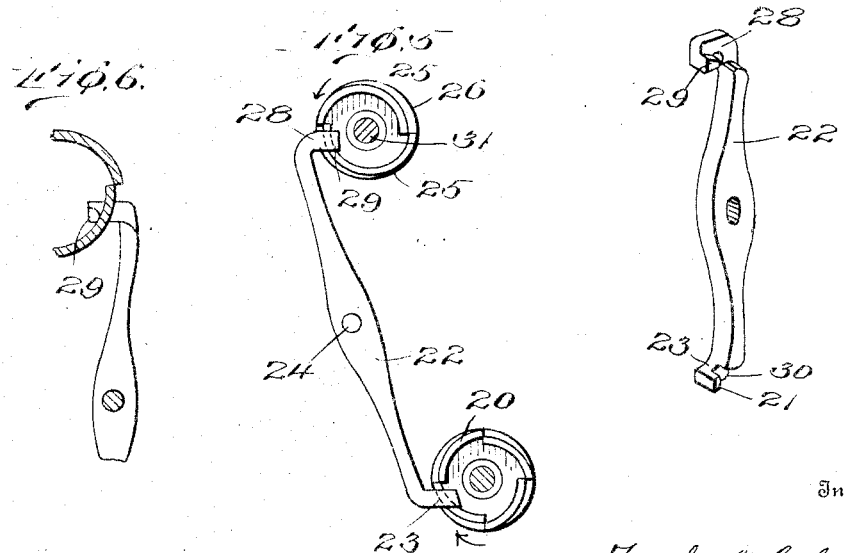
Witnesses
M. Fowler
A. S. Kitchin
Inventor
Frank A. Cole
By Mason Fenwick Lawrence
his Attorneys

UNITED STATES PATENT OFFICE.

FRANK A. COLE, OF PATTON, PENNSYLVANIA.

MOVING-PICTURE MACHINE.

947,095.    Specification of Letters Patent.    Patented Jan. 18, 1910.

Application filed January 4, 1909. Serial No. 470,604.

*To all whom it may concern:*

Be it known that I, FRANK A. COLE, a citizen of the United States, residing at Patton, in the county of Cambria and State of Pennsylvania, have invented certain new and useful Improvements in Moving-Picture Machines; and I do hereby declare the following to be a full, clear, and exact description of the invention, such as will enable others skilled in the art to which it appertains to make and use the same.

This invention relates to improvements in moving picture machines, and particularly to improved means for shutting off the light as the film is moved, and also improved means for taking up the film for properly adjusting the same, and has for an object the arrangement of the shutter operating mechanism, and also to effect the adjustment in such manner as to present a substantially continuous beam of light and at the same time to cause the film to be properly exposed.

Another object of the invention is the provision of means for causing the shutter to cut off the light from passing through the machine for only a small fraction of the time and so arranged as to shut off the light at the instant the film is moving.

A still further object of the invention is the provision of improved means for quickly drawing the film through the machine while the shutter has shut off the light therefrom, the drawing means and the shutter being arranged to act for only a small fraction of the time which is designed to be given to each exposure so that the light on the canvas will be substantially continuous.

With these and other objects in view the invention comprises certain novel constructions, combinations and arrangement of parts as will be hereinafter more fully described and claimed.

In the accompanying drawing: Figure 1 is a side elevation of the machine with the front plate removed in order to better disclose the invention, certain parts being broken away. Fig. 2 is a front elevation of the structure shown in Fig. 1. Fig. 3 is a plan view of the film guiding plate. Fig. 4 is a detail fragmentary sectional view approximately on line 4—4 of Fig. 3. Fig. 5 is a view of a two throw lever and cam wheels, the same being shown inverted for the purpose of illustration. Fig. 6 is a detail fragmentary view partly in section of one end of the two throw lever showing how the end thereof engages its co-acting cam. Fig. 7 is an enlarged perspective view of the two throw lever shown in Fig. 5.

In the construction of moving picture machines or kinetoscopes designed to so rapidly exhibit successive pictures as to give them the appearance of presenting moving objects, it is aimed to rapidly move the film across the beam of light passing through the lens and during the movement of the film to shut off the beam of light. By thus shutting off the beam of light during the movement of the film the picture will not be blurred or distorted. However, the time in which the beam of light is shut off from the lens must be very short and shorter than the interval during which the beam of light is used. In constructing an apparatus according to the present invention means are provided for accomplishing these desirable results in a more effective manner than heretofore, and by such a construction to cause a beam of light to remain longer upon the canvas and make the period of darkness less.

Referring to the drawings by numerals, 1 indicates a framework of any desired kind upon which the various parts of the device are mounted. Mounted at the upper end of the frame is a pair of rollers 2 and at the lower end a pair of rollers 3. Rollers 2 and 3 are both provided with teeth or spurs for engaging the apertures in the side of the film 4 for guiding and feeding the film through the machine, roller 2 being arranged to supply the film or feed the same into the machine, and roller 3 being designed to pull or move the film from the machine. Mounted near rollers 2 is a spring pressed roller 5 that is designed to keep the film 4 in engagement with the spurs or teeth of rollers 2. Rollers 2 and rollers 3 are designed to be continuously moving as long as the machine is in operation, but the film 4 moves intermittently past opening 6 in door 7. This intermittent movement is caused by roller 8 hereinafter more fully described. Roller 8 remains stationary for a short period of time, namely the time in which the beam of light is passed through opening 6, and lens 9, and is moved only when it is desired to feed another picture in front of opening 6. During the period in which the film in front of opening 6 is stationary rollers 2 and 3 are continuously moving. As roller 2 continues to move and yet the film in front of opening 6 is stationary the film is necessarily bulged or bowed out and forms what is known as a loop which permits or presents ample film for permitting the sudden or quick movement of roller 8 to draw another picture in front of opening 6. A loop 11 is also formed between rollers 8 and 3. As roller 8 is given an intermittent movement and quickly feeds the film along the loop 11 is necessary as roller 3 is continuous in its movement. In this manner as rollers 3 move, loop 11 will be reduced in size until a quick movement of roller 8 will cause additional film to be forced past roller 8 and the loop 11 enlarged. Roller 3 will then draw the film in loop 11 gradually out of the machine and reduce the size of the same until roller 8 is given another turn when the loop will be again enlarged. Loop 10 at the top of the machine is designed to permit this sudden or quick movement of the film and to supply a proper amount of loose film at all times. By this construction and arrangement the film is continuously and evenly fed into the machine and removed from the machine, but is intermittently moved past opening 6. During the time in which roller 8 is stationary the film in front of opening 6 is stationary, and consequently a light passing therethrough will project a picture on the canvas.

Roller 8 is formed with spurs or teeth for engaging film 4 for drawing the same intermittently past opening 6. The roller is loosely mounted upon a shaft 12 and is arranged to be moved or rotated by a spring 13. Spring 13 is fastened to the hub of rollers 8, and if desired may be passed entirely therethrough and bent over or clenched so as to positively prevent any accidental removal thereof. Spring 13 surrounds part of shaft 12 and engages at one end clutch 14. The spring is rigidly secured to part 15 of clutch 14 while part 16 of clutch 14 is rigidly secured to shaft 12 by any desired means, as for instance a bolt or rivet. Part 15 is formed with a plurality of apertures 16 in which may be inserted a tool of any desired kind for rotating part 15 in order to bring spring 13 under a greater or less tension. By this construction and arrangement whenever crank 18 is rotated spring 13 will be wound and pressure or tension will be brought to bear upon rollers 8, the tension being torsional so that whenever released rollers 8 will be rotated and by reason of the tension of spring 13 the rotation will be quick, which quick rotation causes a quick movement of film 4 past opening 6. In order to regulate the movement of rollers 8 the flange 19 is formed on one of the rollers which is arranged with a plurality of cams 20. The respective cams 20 are arranged so that there will be a plurality of offsets or notches into which a lug or projection 21 of lever 22 is adapted to move. The lug or projection 21 is preferably formed integral with arm 23 which in turn is preferably formed integral with lever 22. Arm 23 is adapted to fit between flange 19 and the framework 1 so as to permit lug 21 to engage the respective notches formed by cam 20 and yet not come in conflict with film 4.

The rollers 8 are moved by the action of spring 13, but in order to be so moved the lug 21 must be moved out of engagement with the offset portion of one of the cams 20 and when thus disengaged the spring will move the rollers a predetermined distance, that shown for the purpose of illustration being a one-fourth revolution. In order that the lug 21 may be thus moved out of engagement with the end of one of the cams 20 and permit the rotation of the rollers 8 the lever 22 is pivotally mounted at 24, and at its opposite end engages one of the cams 25 on rollers 26. The cams 25 form a flange 27 on rollers 26 and confine the arm 28 of lever 22 between the same and framework 1. The arm 28 is formed with a lug 29 that engages the end of cam 25 and prevents any movement of rollers 26 until disengaged therefrom. When rollers 8 are moving the inner edge of lug 21 is pressing against the inner surface of one of the cams 20 and the point 30 is spaced from the outer surface of the cam about the same distance as the thickness of the cam, so that as the cam continues to move the lower end of the lever 22 will be moved outward. The outward movement of the lower end of lever 22 will, as will be evident, cause an inner movement of arm 28 and cause lug 29 thereof to be raised out of engagement with the end of one of the cams 25. This will permit a free rotation of rollers 26 for a one-fourth turn.

In order to properly rotate rollers 26 the same are loosely mounted upon shaft 31—31 and engage a spring 32. The spring 32 may be secured to rollers 26 in a similar manner to the way spring 13 is secured to rollers 8, and also spring 32 is arranged to be connected with a clutch 33 that is designed to operate in a similar manner as clutch 14, part of the clutch being rigidly secured to shaft 31. Power is conveyed to shaft 31 by a system of gearing hereinafter more fully set forth so that whenever point 29 is disengaged from one of the cams 25 the rollers will immediately rotate a one-fourth revolution under the action of spring 32. This partial rotation will be very quick as will be evident and may be regulated or adjusted by bringing spring 32 under a greater or less tension. The tension of spring 32 is regulated by means of clutch 33 which may be turned as set forth in regard to clutch 14. The end of the rollers 26 opposite flange 27 have formed thereon notches 34 and 35 which are adapted to engage levers 36 and 37. The ends of cams 25 are arranged so that notches are formed upon diametrically opposite sides of the rollers, and notches 34 and 35 are also arranged upon diametrically opposite sides of the rollers, but are stepped forward a one-fourth turn from the notches formed by the ends of cams 25 so that when the lug or point 29 is disengaged and rollers 26 are rotated one of the levers 36 or 37 will engage one of the notches 34 or 35 and stop the movement of the rollers after the same have traveled a one-fourth turn. Neither of the rollers 26 or 8 can rotate when either of the levers 36 or 37 is holding rollers 26 from moving. In order that the levers 36 and 37 may be released a pair of cams 38 and 39 are provided that depress the outer ends of the respective levers 36 and 37 and move the same upon their pivotal mounting 40, and consequently disengage the same from their respective notches. As soon as disengaged the rollers 26 will begin to rotate under the action of spring 32 until the same are stopped by having lug 29 engage the end of one of the cams 25. Secured to the rollers 26 is a shutter formed by blades 41 and 42 for shutting off the beam of light that is projected through opening 6 and lens 9, and also through film 4 for causing a picture to be projected on the canvas. In operating the machine the levers 36 and 37 are adapted to stop the rotation of rollers 26 only when the blades 41 and 42 are in a horizontal position and the lug 29 is adapted to stop the rollers 26 when either of the blades 41 or 42 have shut off the beam of light from passing through the machine from opening 6 to lens 9. The time in which lug 29 stops the rotation of rollers 26 is very short, namely only sufficiently long for permitting a one-fourth rotation of rollers 8. During the time which point 29 is holding roller 26 against movement one of the fans or blades 41 or 42 is shutting off the light so that the short time which it holds the fans against movement is of great advantage. As it holds the blades against movement and one of the same in front of opening 6 during the movement of rollers 8 it will be seen that the light is shut off during the movement of the film 4 past opening 6 as the film is drawn past the opening 6 by rollers 8.

In order that power may be transmitted to rollers 26 and to cams 38 and 39 and the hub of roller 43 a system of gearing is used that distributes power from cam 38 to all of these parts. The crank 28 is rigidly connected with shaft 12 for rotating the same which in turn has connected therewith a large gear wheel 44 and a small gear 45. The small gear 45 engages an idler 46 which in turn engages gear 47. Gear 47 is rigidly secured to a shaft 48 that has rigidly secured therewith rollers 3. By the provision of the idler 46 rollers 3 will rotate in the same direction as shaft 12. Gear wheel 44 is in mesh with gear 48, which in turn is rigidly secured to shaft 31, and by this means power is conveyed to shaft 31, and thence to spring 32 to clutch 33. From spring 32 power is conveyed as heretofore set forth to certain of the moving parts. Meshing with gear 48 is an idler 49 that in turn meshes with a gear 50. Gear 50 and gear 44 are the same size so as to rotate the rollers 2 and 3 at the same speed though in opposite directions. Gear wheel 50 is rigidly connected with shaft 51 which has rigidly secured thereto by any desired means, as for instance a set screw, the rollers 2. By this system of gearing rollers 2 and 3 operate in opposite directions, but as film 4 passes beneath the rollers 2 and above the rollers 3 the film is fed through the machine without difficulty. Meshing with idler 49 is a gear 52 which is rigidly secured to shaft 53 which has rigidly secured thereto the roller 43 that in turn carries the cams 38 and 39. This arrangement of gearing and by the various sizes of the gears shaft 53 will make the complete rotation for each one-half rotation of shaft 12. As will be evident at each complete rotation of shaft 53 both of the cams 38 and 39 will have operated for releasing both of the levers 36 and 37 once, and from this it will be observed that for each one-fourth rotation of rollers 8 there will be a one-half rotation of roller 43 and the releasing of one of the levers 36 or 37 as the case may be. Also by this system of gearing it will be observed that power is transmitted to shaft 31 and to spring 32 so that upon the rotation of crank 18 power is conveyed to all of the moving parts and the same are permitted to operate in succession as designed. By the use of lever 22 and the various associated parts it will be observed that each part must operate before the succeeding part can operate.

In starting the machine and upon a partial rotation of crank 18 one of the cams 38 or 39 will be moved for releasing one of the levers 36 and 37 which will permit one of the blades 41 or 42 to pass in front of opening 6. Immediately upon the movement of rollers 26 for permitting one of the blades 41 or 42 to come in front of opening 6 the lower end of lever 22 will be moved out of engagement with the end of one of the cams 20 and permit a quick movement of the rollers 8, and consequently a quick movement of the film across opening 6 for changing the view. Immediately upon the completion of the one-fourth rotation of the rollers 8 the upper end of lever 22 will be raised out of engagement with the ends of cams 25 which will permit spring 32 to turn rollers 26, and consequently blades 41 and 42 a one-fourth revolution. One of the levers 36 or 37 will stop the rotation of rollers 26 and hold the same against movement and the blades 41 and 42 out of the path of the beam of light that is projected through opening 6 until one of the cams 38 or 39 moves the levers for disengaging the same. Upon the movement of one of the cams 38 or 39 one of the levers 36 or 37 will be disengaged and permit a one-fourth rotation of rollers 26, and consequently blades 41 and 42 for closing off the beam of light. The rotation of the rollers by spring 32 thus disengaged will, of course, rotate cams 25, which in turn will move the upper end of lever 22 outward and cause the inner end to be moved inward. Upon the inner movement of the lower end of lever 22 rollers 8 will rotate a one-fourth turn, and during the rotation thereof will automatically move outward the lower end of lever 22, and as will be evident at the same time move inward the upper end of the lever. This will disengage the upper end of the lever from the end of one of the cams 25 and permit a one-fourth rotation thereof under the action of spring 32. Upon the completion of the one-fourth rotation the rollers are stopped in their movement by one of the levers 36 or 37. This successive releasing of rollers 26 by levers 36 and 37 and then releasing of rollers 38 and then again releasing of rollers 26 is continued as long as crank 18 is turned. It will be observed that it is first necessary to release one of the levers 36 or 37 by one of the cams 38 or 39 for permitting a partial rotation of rollers 26 which carry the shutter blades 41 and 42. This partial rotation acts upon the upper end of lever 22 for releasing the lower end which in turn is operated by the action of the cams on rollers 8 that again moves the lever for again releasing rollers 26. This successive releasing and stopping of the various rotating parts permits the proper action of the shutters and the film at the proper time. It will be observed that the time in which the shutters 41 and 42 are held in a horizontal plane or out of a beam of light is regulated by the speed with which crank 18 is turned, but the time in which either of the shutters 41 or 42 are shutting off the beam of light is very small being almost instantaneous. The action however may be regulated to a certain extent by the tension of springs 13 and 32.

Connected with the shaft upon which the idler 49 is secured is a fly wheel 54 which assists in giving an even continuous movement to the machine so that there will be no sudden or quick passage of pictures through the machine, and then a slower passage of pictures but a substantially even passage of pictures. Of course it will be evident that the fly wheel 54 will not prevent either the slow operation of the machine or the fast operation thereof as occasion may require.

In order that the film 4 may properly pass through the machine, and also that the various pictures on the film may be stopped directly in front of opening 6, a take up device or adjustment is arranged for varying the distance of travel between the opening 6 and rollers 8. In constructing this adjustment a pair of springs 55 and 56 are rigidly secured to a bar 57 that is mounted in framework 1 by any desired means, as for instance a set screw. The springs 55 and 56 extend toward opening 58 in guiding plate 59, and beneath a guiding bar 60. The end opposite bar 57 is loosely mounted and bar 60 simply guides the same in its movement so that when eccentric 61 is moved the same will bear against guiding springs 64 and 65 and force the edges of the film against springs 55 and 56. The eccentric 61 may be moved to any desired distance for bowing inward springs 55 and 56, and consequently cause a longer travel of the film between opening 58 and rollers 8. This will adjust the film so as to cause the picture thereon to be properly positioned between the openings 6 and 58. This arrangement of adjustment as will be evident is easily operated, and will not easily get out of order and may be operated or adjusted for shifting the position of any of the pictures at any time whether the machine is in motion or not. The eccentric 61 is pivotally mounted in the door 7 and is preferably reduced centrally so that only the edges thereof engage the film, and consequently no pressure will be brought on the film at the part which is occupied by the picture.

In connection with the adjustment there is arranged a plurality of guiding means for guiding and regulating the position of the film as the same passes through the machine. A pair of springs 62 and 63 are rigidly secured to bar 57 and extend upward to a short distance, preferably to a position opposite approximately the center of opening 58 (Fig. 3), the same being so adjusted on bar 57 as to project a short distance above plate 59, and consequently form side guides for the film as shown in Fig. 4. A pair of guides 64 and 65 are secured to door 7 and press upon the surface of the edges of film 4 for holding the same perfectly flat, as the film passes opening 58.

What I claim is:

1. In a moving picture machine, a frame, means for feeding a film through said frame, a rotating shutter for shutting the light off of the films during the movement thereof through the frame and a two-throw lever for controlling the movement of said shutter.

2. In a moving picture machine, a frame, means for passing a film through said frame, a rotary spring pressed shutter for shutting off light during the movement of said film, a lever for controlling the movement of said shutter, and means for intermittently moving said lever.

3. In a moving picture machine, a frame, means for feeding a film through said frame, a shutter for shutting off the beam of light during the movement of said film, a lever for controlling said shutter, means for releasing said lever for permitting said shutter to move, and continuously operating means for moving said last mentioned means.

4. In a moving picture machine, a frame, a roller for feeding a film into said frame, a roller for withdrawing the film from said frame, a roller for drawing said film past a beam of light, a lever for controlling the action of said last mentioned roller, a shutter for shutting off said beam of light when said film is being moved, means engaging said lever for determining the time at which said shutter shall operate, and means for operating the last named lever.

5. In a moving picture machine, a frame, means for passing a film into said frame, a roller for drawing said film past a beam of light projected through said frame, formed with depressions thereon, a lever engaging said depressions for controlling the action of said roller, means for rotating said roller when said lever is not engaging with said depressions, a shutter for shutting off said beam of light when said film is being moved, a rotating member connected with said shutter for controlling the same, said rotating member being adapted to be engaged by one end of said lever, and means for intermittently rotating said shutter.

6. In a moving picture machine, a frame, means for passing a film through said frame, means for intermittently drawing said film past a beam of light projected through said frame, an intermittently operated rotating shutter, and means for operating said shutter for shutting of said beam of light when said film is moving.

7. In a moving picture machine, a frame, means for feeding a film into said frame, means for feeding said film out of said frame, a roll for intermittently moving said film across said frame, a rotating shutter for shutting off the light projected through said film, spring pressed means for moving said shutter for shutting off said light during the movement of said film through said frame, spring controlled means for rotating the means for intermittently moving said film through said frame, and means for causing said shutter and said intermittent means to act in a predetermined relationship to each other.

8. In a moving picture machine, a frame, means for feeding a film through said frame, a rotary shutter for shutting off the light from said film during the movement of the film, and means for causing the time in which said light is shut off to be the same regardless of the speed of the machine.

9. In a moving picture machine, a frame formed with an opening for the passage of a beam of light, means for feeding a film through said frame, a roller for moving said film quickly past said opening, a cam for controlling the action of said roller, a lever engaging said cams for holding said roller against movement, a shutter for shutting off the light at predetermined intervals, cams connected with said shutter adapted to be engaged by one end of said lever, said second mentioned cam being so arranged as to be released upon the movement of said first mentioned cam, such arrangement permitting said shutter to be moved from across the beam of light immediately after the film has been drawn past said opening.

10. In a moving picture machine formed with an opening therein for the passage of a beam of light, means for feeding a film through the machine, means for intermittently drawing the film across said opening, a shutter adapted to shut off the beam of light during the movement of the film across said opening, means for holding the shutter across the beam of light during the movement of the film, a pair of levers for stopping and holding the shutter in a position for permitting the beam of light to pass through the machine, and means regulated by the speed of the film through the machine for operating said levers for disengaging the same from the shutter for permitting the same to shut off the beam of light.

11. In a moving picture machine having an opening formed therein for the passage of a beam of light therethrough, means for passing a film therethrough, means for intermittently drawing the film across said opening, a double acting lever for regulating the action of said intermittently acting means, a shutter for shutting off said beam of light, means connected with said shutter and engaging the opposite end of said lever whereby said shutter will be stopped when the same has reached a position for shutting off a beam of light, means for rotating said shutter, and means for stopping the rotation of said shutter after the same has been released by said lever, said last mentioned means stopping the shutter at a position for permitting the light to pass through said machine.

In testimony whereof I affix my signature in presence of two witnesses.

FRANK A. COLE.

Witnesses:
JOHN L. FLETCHER,
E. T. FENWICK.